E. V. HARTFORD.
ELECTRICALLY OPERATED BRAKE MECHANISM.
APPLICATION FILED AUG. 27, 1914.
1,271,163.
Patented July 2, 1918.
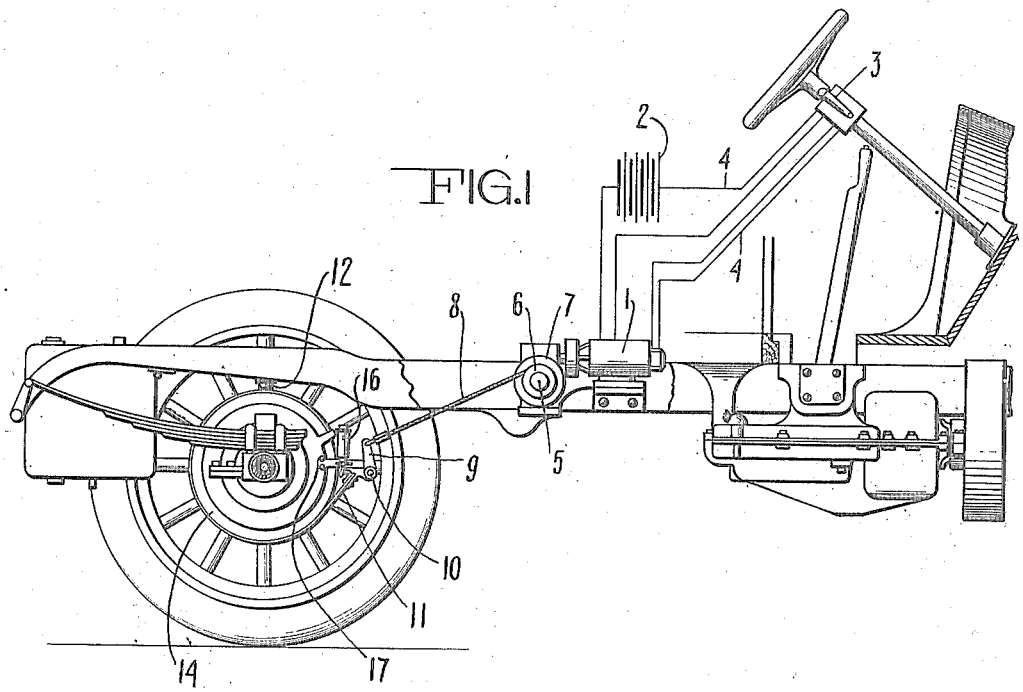
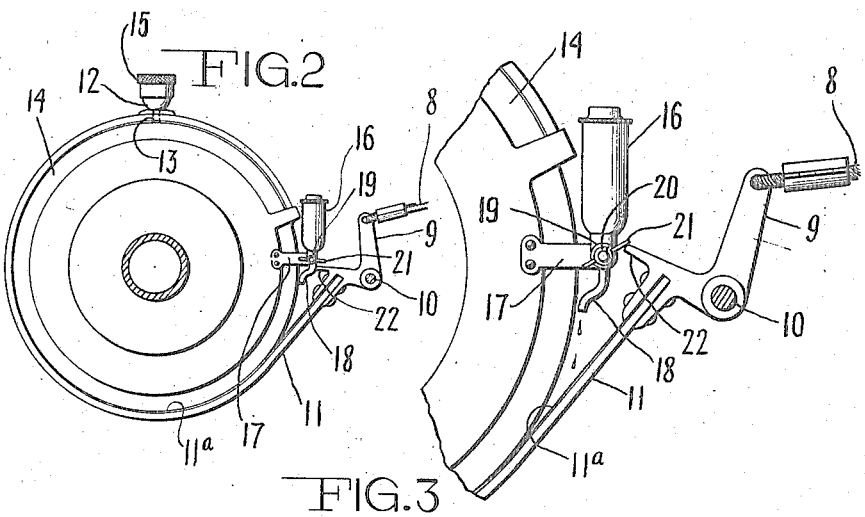
WITNESSES:
INVENTOR.
Edward V. Hartford
BY
ATTORNEY

UNITED STATES PATENT OFFICE.

EDWARD V. HARTFORD, OF DEAL, NEW JERSEY.

ELECTRICALLY-OPERATED BRAKE MECHANISM.

1,271,163.  Specification of Letters Patent.  Patented July 2, 1918.

Application filed August 27, 1914. Serial No. 858,958.

*To all whom it may concern:*

Be it known that I, EDWARD V. HARTFORD, a citizen of the United States, residing at Deal, in the county of Monmouth and State of New Jersey, have invented certain new and useful Improvements in Electrically-Operated Brake Mechanisms for Automobiles and other Vehicles, of which the following, taken in connection wtih the accompanying sheet of drawings, forms a full, clear, and concise description thereof.

My invention relates more particularly to an improved electrically operated brake mechanism such as is illustrated and described in my co-pending application, filed April 22nd, 1912, bearing Serial Number 692,488. In said application I have described an electrically applied brake mechanism comprehending or including a small, high speed low voltage electric motor geared down to a brake cable winding drum which is coöperably associated with the well known brake bands commonly used in connection with automobiles. The motor operates on a very low voltage, preferably 6 volts, this being sufficient to overload the motor to extent approximating 400% which overload is permissible as the actual service time is of short duration. The power of the motor is transmitted through a reduction gearing to the brake cable winding drum. This power I have found even where such a small motor is used exceeds the required power necessary to apply the brake bands effectively. My experience has shown, for instance, that a 3000 lb. pull is capable of being developed within approximately 2 seconds of time by a motor of the described character, this is sufficient to cause the brake bands to be applied so tightly as to lock the wheels and prevent their rotation. This, of course, is very detrimental to the vehicle tire and is liable to destroy the brake mechanism.

It is the object of my present invention to overcome or eliminate the liability of locking the wheels in this manner. I have found in practice that by furnishing a lubricant to the brake drum and brake band the premature locking of the two by the high power of the motor is prevented.

In the illustrated embodiment I have shown two methods or means for furnishing the desired lubricant to the brake drum and band. One takes the form of the usual grease cup which I have mounted upon the brake band which contains and furnishes a suitable grease. It is understood that the grease is forced from the cup and caused to enter between the band and the drum in two ways. One by forcing the cup downwardly thus forcing the grease to take the desired course, the other automatically by reason of the heat generated by successive application of the brake bands.

The alternative way is by employing an oil reservoir provided with a valve controlled outlet which is automatically manipulated and supplies fluid oil to the drum and band when the latter is operated. In either case the lubricant reduces the frictional adherence between the drum and band, and permits the surfaces to slide upon one another, when the tension of the band is increasingly applied by the motor, thus eliminating the abrupt stoppage of the rotating brake drum and the incident locking of the wheels, as has been experienced in the absence of lubrication.

In the accompanying drawings, I have illustrated in Figure 1 so much of a chassis and running gear of an automobile as is necessary for a complete understanding of my invention. To these parts I have added my high speed electric motor and specific brake applying instrumentalities that are comprehended within my invention.

Fig. 2 is an enlarged view in side elevation of a brake drum and band and lubricating means.

Fig. 3 is a fragmentary detail of the same showing the oil reservoir controlling valve in open or feeding position.

In detail the numeral 1 indicates an electric motor of the high speed low voltage type. 2 is a source of electric energy preferably a 6 volt battery. 3 is the controlling switch controlling the energization of the motor. 4—4 indicate the motor energizing circuits. The motor 1 is mounted at any convenient point on the chassis of automobile; a reducing train of gears gears the armature of the motor down to a counter shaft 5 upon which is mounted a cable winding drum 6. The gears forming the connection between the winding drum 6 and motor 1 are housed within the housing 7 and are of the ratio of 2500 to 1. A reduction of this extent imparts a relatively slow rotation to the cable winding drum 6, it being understood that the motor normally operates under a speed of approximately 20,000 R. P. M. The motor 1 is what might be termed a "toy" motor and is designed to operate under a very low voltage, so low that I have found a 6 volt battery overloads the motor way beyond its intended load. I should approximate this overload to be about 400%. The motor is capable of withstanding this excessive load for a short length of time since an inconsiderable amount of brake applying cable is only necessary to be wound upon the cable winding drum 6 to successfully apply the brakes. Fastened to the drum 6 and capable of being wound thereon is the brake applying cable 8. The lower end of this cable is operably fastened to a bell crank lever 9 pivoted on the spindle or shaft 10 which may be supported in a suitable bracket beneath the chassis. This bell crank lever is fastened to one end of the brake band 11. Mounted upon brake band 11 is a grease cup 12 of the usual and well known construction. The brake band 11 is perforated at 13 so as to allow the grease to be forced down from the cup to between the brake band 11 and the brake drum 14. The grease cup 12 is provided with a screw threaded cap 15 by which the grease can be forced from the cup in the usual manner, it being understood that as the friction increases between the rotating drum 14 and the brake band 11 when the brake band is being applied thereto, heat is created which causes the grease to melt and flow in between the two surfaces, thus lubricating them and preventing them adhering abruptly and consequently preventing the locking of the wheels. It will be understood that the brake band is provided with a suitable brake lining of friction material 11ª as is usual. This material is provided with a perforation or opening through which the grease is forced to the drum.

When desirable, I may dispense with the grease cup 12 and use an oil reservoir 16 in which a fluid oil may be deposited to be subsequently fed to the brake drum and band. This reservoir 16 may be supported by a suitable bracket 17. In order to effect proper feeding of the oil from the reservoir 16 between the brake drum and band an outlet 18 controlled by the valve 19 is provided. Valve 19 is of the automatic self-closing type, a spring 20 furnishing the power for closing same. The valve is provided with a projecting finger 21 which is in line to be engaged by a finger 22 extending outwardly from the bell crank lever 9. It will be observed that as the cable 8 is wound on the drum 6 the bell crank lever 9 will oscillate on spindle 10, causing the finger 22 to swing in an arc which crosses the normal position of the finger of the valve, engaging and moving the latter, rotating the valve to its open position which permits the lubricant to drop from the reservoir 16 as is more clearly detailed in Fig. 3.

Thus I am enabled to take care of the high power developed by the motor and dissipate it in the fashion stated which prevents the objectionable locking of the vehicle wheels, thus saving wear upon tires and possible disarrangement of the mechanism.

While I have shown two specific ways of accomplishing the desirable result mentioned I do so by way of example only. The illustrated and described embodiments are simple specific ideas which I have found conveniently accomplish the purpose. It is manifest that there may be other suitable ways which might be devised or used for furnishing the lubricant to the drum and band. These illustrated embodiments are, therefore, illustrative rather than definitive as I wish to avail myself of a fair range of equivalents which may be warranted by the art and in keeping with the scope and tenor of the appended claims.

Having thus described my invention what I claim as new herein and desire to secure by Letters Patent is:—

1. In a brake system, the combination of brake applying means, including a brake drum, a brake band, and means for automatically supplying lubrication to the drum and band during the application of the latter, the quantity of lubrication supplied being directly proportionate to the power exerted in applying the brake.

2. In an electrically operated brake mechanism for automobiles, the combination of a brake drum, a brake band associated therewith, lubricating means and means operated by the movement of the brake band for operating the lubricating means so that lubricant will be applied to the drum and the band.

3. In an electrically operated brake mechanism for automobiles, the combination of a brake drum, a brake band associated therewith, an electrically operated cable winding drum, a flexible cable for connecting the brake band with the cable winding drum and means for furnishing a lubricant to the drum and band during the winding of the cable upon the cable winding drum.

4. In an electrically operated brake mechanism for automobiles, the combination of a brake drum, a brake band coöperatively associated therewith, a valve controlled oil reservoir, a brake applying cable, and means associated with the brake band and the brake applying cable adapted to operate the valve of the oil reservoir during the application of the brake band so that lubrication will be furnished to the brake drum and band.

5. In an electrically operated brake mechanism for automobiles, the combination of a brake drum, a brake band coöperatively associated therewith, an oil reservoir, a self-closing valve for controlling the feed of the oil from said oil reservoir, brake applying cable and means associated with the brake band and the brake applying cable adapted to operate the valve of the oil reservoir during the application of the brake band to furnish lubrication to the latter and the brake drum.

6. In an electrically operated brake mechanism for automobiles, the combination of a brake drum, a brake band coöperatively associated therewith, an air reservoir, a self-closing valve for controlling the feed of the oil from said oil reservoir, brake applying cable, and a bell crank lever mounted upon a shaft, one of the arms of said lever being connected to said cable, the other arm thereof being fastened to the brake band and provided with a finger adapted to operate said valve, whereby oil is supplied to the drum and band during the application of the latter.

In witness whereof, I have hereunto set my hand in the presence of two subscribing witnesses.

EDWARD V. HARTFORD.

Witnesses:
ARTHUR WATERMAN,
MORRIS E. ROTHHOUSE.